Dec. 9, 1941.  F. W. JOHNSON ET AL  2,265,372

SLIDE RULE

Filed Aug. 6, 1938  2 Sheets-Sheet 1

INVENTOR.
Frederick W. Johnson
Frank M. Goyan
BY
ATTORNEYS.

Dec. 9, 1941.　　　F. W. JOHNSON ET AL　　　2,265,372
SLIDE RULE
Filed Aug. 6, 1938　　　2 Sheets-Sheet 2

INVENTORS.
Frederick W. Johnson
Frank M. Joyan
BY
ATTORNEYS.

Patented Dec. 9, 1941

2,265,372

UNITED STATES PATENT OFFICE 2,265,372

SLIDE RULE

Frederick W. Johnson and Frank M. Goyan,
San Francisco, Calif.

Application August 6, 1938, Serial No. 223,492

3 Claims. (Cl. 235—89)

Our invention relates to tabular logarithmic calculating devices of the general class commonly known as slide rules, and is directed particularly to improvements therein for facilitating calculation with scales of greater length than have heretofore been used. Certain of the improvements may, however, be used advantageously with shorter scales, as will appear from the accompanying description, and also with non-logarithmic scales of equal parts.

In previous devices of the general class to which our invention belongs, such as that disclosed by the patent to Thomas, No. 1,040,592 dated October 8, 1912, the accuracy obtainable, while greater than that provided by linear slide rules, has been circumscribed by the practicable limits of size of the scale sheets. Furthermore, such devices have provided no convenient means for finding logarithms and cologarithms (hereinafter referred to generically as logarithmic functions) of numbers shown on the scale sheet, particularly if the scale consists of more than ten lines.

Having in mind the foregoing deficiencies of the prior art devices, it is an object of our invention to provide a logarithmic and nonlogarithmic calculating device utilizing a scale of greater length than can be conveniently carried upon a single scale sheet.

Another object of our invention is the provision of convenient means for finding various logarithmic functions of numbers disposed upon a logarithmic scale divided into a large number of lines.

A further object of our invention is the provision of a simple and convenient device for indicating to the user of a device of the general class described, the proper orientation of the relatively movable members for securing simplified operation thereof.

A further object of our invention is the provision of an improved construction for an indicating slider and marker mounting for use with devices of the general class described.

The novel features characteristic of our invention are defined with particularity in the appended claims. The invention, itself, however, together with additional objects and advantages thereof, will be best understood from the following description of specific embodiments thereof when read with reference to the accompanying drawings, in which:

Figure 1:
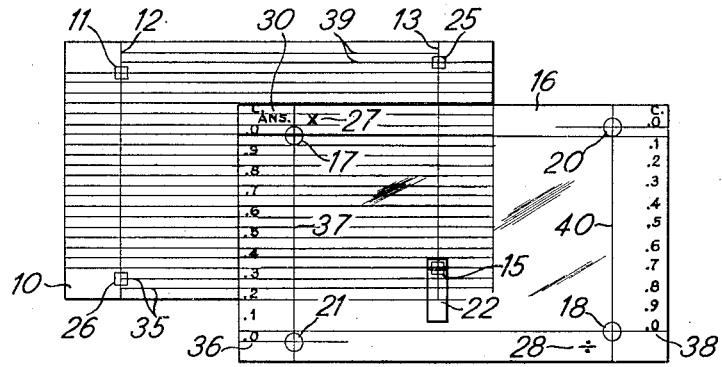
Figure 1 is a plan view of a logarithmic calculating device embodying our invention, the scale sheet being illustrated diagrammatically to represent either a scale sheet provided with a complete logarithmic scale, or a scale sheet provided with a portion of such a scale as hereinafter explained.

In order to make clear the simpler features of the invention, it may be most conveniently described at the outset as embodied in a device utilizing a single scale sheet provided with a complete scale. Thus, in Figure 1, the scale sheet 10 is to be understood as provided with a complete logarithmic scale beginning at the point designated 11 and extending along the successive horizontal lines of said sheet between the vertical lines 12 and 13 to the point 15. The divisions of this scale are not shown in Figure 1 in order to avoid confusion of the drawing, but it is understood that they are intended to be inscribed in the manner well known in the art.

A transparent sheet 16, of any suitable material, is adapted to be placed over the scale sheet 10 and is provided with index point markings 17 and 18 disposed thereon so as to register with the points 11 and 15 of the scale sheet respectively when the sheets are superposed. Additional index point markings 20 and 21 in vertical alignment with but one scale line space width above and below the scale limits when the sheets are superposed, are also provided on the sheet 16 for a purpose which will be described. The four index points 17, 18, 20, and 21 on the transparent sheet 16 will hereinafter be referred to as indices; and the corresponding four points on the scale sheet 10 with which the four indices may be made to coincide when the transparent sheet is superposed on the scale sheet; namely, points 11, 15, 25, and 26, will hereinafter be referred to as "origins" since each one of these four points on the scale sheet is the origin of an actual or of a hypothetical scale identical with the scale extending between points 11 and 15.

In performing multiplication with the above described device, the transparent sheet 16 is superposed upon the scale sheet 10 with any one of its indices 17, 18, 20 or 21 in registry with the point indicating the multiplier value on the scale sheet 10. A movable indicator, such as the transparent adhesive marker 22, is then attached to the transparent sheet to indicate the point thereon overlying that one of the origins 11, 15, 25 or 26 of the scale sheet which is included within or intercepted by the perimeter of the large rectangle on the transparent sheet 16. The transparent sheet is then moved, without changing the marker's position relative to it, so as to cause the marker 22 to overlie the position on the scale sheet 10 which indicates the multiplicand value, whereupon the index which is now superposed upon the scale of sheet 10 will overlie and indicate the product value on the scale sheet. It is to be understood that while any setting or reading herein described is being performed, the transparent sheet and the scale sheet must be maintained in parallelism with each other.

In performing division with this single-page scale, the transparent sheet 16 is superposed upon scale sheet 10 so that an index 17, 18, 20 or 21 of the transparent sheet overlies the dividend value on the scale sheet, that index being chosen which will cause the divisor value to be included within or intercepted by the perimeter of the large rectangle on sheet 16. Marker 22 is then attached to sheet 16 to indicate the point thereon overlying the divisor value on the scale sheet and the transparent sheet is moved so as to bring the marker to either one of the origins 11, 15, 25 or 26 on the scale sheet, whereupon that index of the transparent sheet which is now superposed upon the scale of sheet 10 will overlie and indicate the quotient value on the scale sheet.

When both multiplication and division are to be performed during a single calculation, the process as described above can be materially shortened. For example, in solving a problem of the general type $ab \div c$, an index of the transparent sheet would be superposed over $a$ on the scale sheet, the particular index being chosen which would cause $c$ on the scale sheet to be intercepted by or included within the perimeter of the large rectangle of the transparent sheet; the marker 22 would then be placed upon the transparent sheet so as to overlie $c$, and the transparent sheet would be moved so as to cause the marker to overlie $b$ on the scale sheet, whereupon that index of the transparent sheet now superposed on the scale of sheet 10 would overlie the position on sheet 10 which would indicate the result of the calculation. This procedure will apply to any number of factors in either the dividend or the divisor of such an expression. It is to be noted that the operation immediately preceding the reading of the result must in such a case always be that of multiplication and that whenever necessary the number 1, which is indicated by the position of any one of the four origins 11, 15, 25 or 26 on the scale sheet, may be used as a factor.

Our device may be used to find the mantissa value of the logarithm or cologarithm of any value indicated on the scale sheet 10 with greater ease than has been possible with previous devices of the same class. As is diagrammatically illustrated in Figure 1, the logarithmic scale extending from point 11 to point 15 of the scale sheet 10 is divided into twenty lines. Also disposed upon the sheet 16 is a scale of equal parts 35 which, according to our invention, is divided into as many lines as there are decades of lines in the cooperating logarithmic scale 11—15, and hence in the illustrated embodiment is divided into two lines. Disposed upon the transparent sheet 16 so as to appear to lie upon extensions of the odd-numbered lines of the logarithmic scale 11—15 when sheet 16 is superposed on sheet 10, so that the indices 17, 18, 20 and 21 of sheet 16 coincide with the origins 11, 15, 25 and 26 of sheet 10, is a column of digits 36 descending in value from the top to the bottom of the column. With this arrangement, the index point 17 of sheet 16 may be superposed upon any value in the scale 11—15, and with the sheets 10 and 16 maintained in parallelism as before, the vertical line 37 intersecting points 17 and 21 will cross the two lines of the scale of equal parts 35. The one of these lines upon which the logarithm is to be read is the one upon which one of the digits of the column 36 appears to lie when the sheets 10 and 16 are adjusted as above described, and the digit appearing there will be the first digit of the mantissa of the desired logarithm, the remaining digits being indicated by the intersection point of line 37 with the scale, which is, of course, calibrated in equal parts from left to right.

Cologarithms may be determined in the same way by means of a second column of digits 38 in reverse order with respect to the column 36, and a second scale of equal parts 39 calibrated from right to left. In finding cologarithms with this arrangement, the index point 18 will be superposed upon the value in scale 11—15 and the intersection of line 40 with the scale 39 will give the digits following that indicated by the digit of column 38 lying on a line of said scale.

Figure 2:
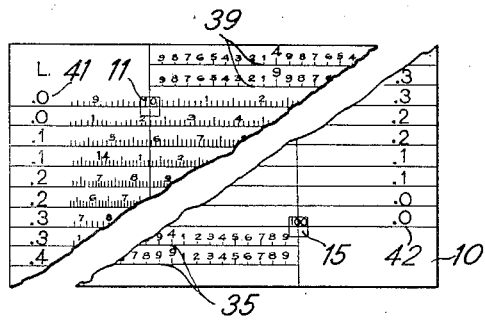
Figure 2 is a fragmentary plan view of one form of scale sheet adapted for use in a device embodying our invention.
Figure 3:
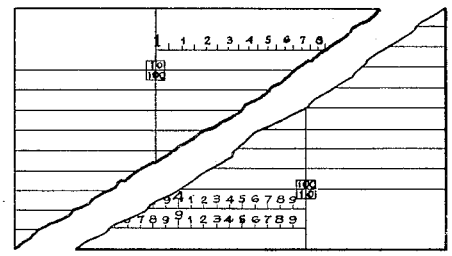
Figure 3 is a fragmentary plan view of an alternative form of said scale sheet.

An alternative arrangement for finding these logarithmic functions of values on the scale 11—15 is illustrated in Figure 2 in which the scale sheet 10 corresponds to that shown in Figure 1 except that reversed columns of repeated digits 41 and 42 appear at each side of the sheet. With this scale sheet it is unnecessary to have columns of digits 36 and 38 on the cooperating transparent sheet 16 since the first digit of the mantissa of the function is shown on the extension of the line of scale 11—15 upon which the value is shown the function of which is sought, and the line of the scale of equal parts 35 or 39 upon which the remaining figures of the function are to be read in the manner described above is known from the fact that, according as the upper or the lower of the two identical figures in column 41 or 42 is read for the first figure of the mantissa of a function, the remaining figures of the function are found on the upper or lower line of the scale of equal parts 35 or 39. When this alternative arrangement is used it is possible to substitute any rectangle, such as a card, for the transparent sheet. Then, if a corner of the rectangle is placed at any number on scale 11—15 in such a way that an edge of the rectangle intersects at right angles the proper scale of equal parts 35 or 39, the first figure of the mantissa of the function can be read as explained above and the remaining digits will be indicated by the point of intersection of the proper line of the scale of equal parts with the edge of the rectangle.

With the foregoing explanation of the mode of operation of devices of this general class, understanding of a further and important improvement in such devices, contemplated by our invention, will be facilitated. While prior devices have been limited, in the length of the logarithmic scale used, to a length capable of being carried on a single sheet or similar member of reasonable size, our invention contemplates division of the scale not only into a plurality of lines on a scale sheet, but also into a plurality of separate sheets, so that a very long scale may be carried upon a series of sheets. For this purpose our invention provides correlating indicia upon each of the sheets in such a series whereby any number of them may be used successively in a single calculation.

Figure 4:
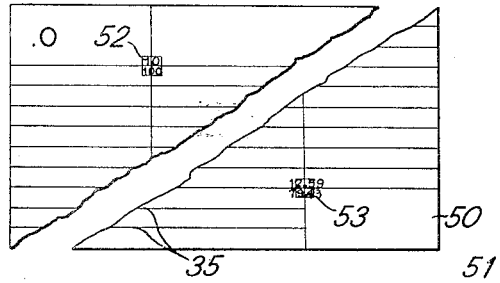
Figures 4 and 5 are fragmentary plan views of two of a set of scale sheets adapted to carry a subdivided scale of greater length according to our invention.
Figure 5:
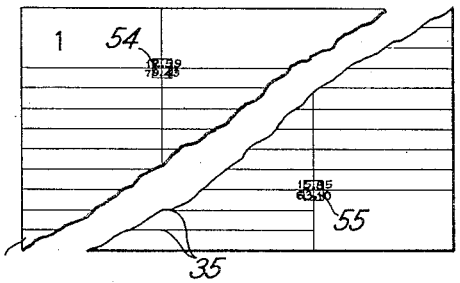

Figures 4 and 5 illustrate two scale sheets 50 and 51 of a series of scale sheets which may, for instance, include ten sheets each bearing, on twenty lines, one-tenth of a thousand-inch logarithmic scale. Assuming sheet 50 to be the first sheet of such a series, the origin 52 thereon will be the beginning of the scale, origin 53 corresponding to origin 15 in Figure 1 will be the end of the first equal portion of the scale, and supplementary origins corresponding to origins 25 and 26 in Figure 1 (not shown in Figures 4 and 5), are placed in vertical alignment with origins 52 and 53. The one above origin 53 is spaced one scale line space width above the uppermost scale line and the one below origin 52 is spaced one scale line space width below the lowermost scale line, corresponding to points 25 and 26, respectively, of Figure 1. In a similar manner each equal portion of the scale is to be equipped with four origins corresponding to points 11, 15, 25, and 26, shown in Figure 1. Origin 53 of sheet 50 will have exactly the same scale value as origin 54 of the next succeeding sheet 51, and each successive sheet will be correspondingly correlated with that preceding and following it. All such scale sheets will be numbered consecutively, beginning with 0. A transparent sheet 16 similar to that illustrated in Figure 1 is used with these scale sheets, being provided with indices 17 and 18 adapted to register with the origins 52 and 53 or 54 and 55, etc., of any sheet of the series.

When using this multisheet form of the scale for multiplication, the procedure is the same as that already described for multiplying by the use of a single-sheet scale except that it is desirable to use the method described below for finding the page on which the result is to be read.

But when division is to be performed by the use of the multisheet scale, we prefer to use the following procedure. After placing any index 17, 18, 20 or 21 of the transparent sheet in registry with the dividend value on the scale sheet and placing the marker at an origin of the scale sheet as described for the process of multiplication, the transparent sheet is inverted with respect to the scale sheet, and the former is moved so as to bring the marker 22 to a position overlying the divisor value on the scale sheet. Then the marker is moved to an origin of the scale sheet, as described for the process of multiplication, and the transparent sheet is reinverted with respect to the scale sheet before the result of the calculation is read.

The location of the page upon which the result of the calculation is to be read may be determined by a preliminary calculation, but we prefer to use the following procedure. Each time a factor of a multiplier or of a multiplicand or of a dividend is used in calculating add the page number of the page upon which such a factor occurs, adding one additional unit each time one of the two lowermost origins of a scale sheet is found to be intercepted by or included within the perimeter of the large rectangle on the transparent sheet immediately after the marker 22 has been brought into coincidence with a position on the scale sheet representing such a factor. Similarly, each time a factor of a divisor is used in calculating, subtract the page number of the page upon which such a factor occurs, subtracting one additional unit each time one of the two lowermost origins of a scale sheet is found to be intercepted by or included within the perimeter of the large rectangle on the transparent sheet immediately after the marker has been brought into coincidence with a position on the scale sheet representing a factor of a divisor. In such cases, if the minuend is smaller than the subtrahend, ten units are first to be added to the minuend when a ten-page scale is being used, 100 units when a hundred-page scale is involved, etc. In the case of a ten-page scale, the last digit obtained by the procedure given above will indicate the plate number of the page on which the result of a given calculation is to be read, the last two digits will indicate the proper page in the case of a hundred-page scale, etc. The pages of a hundred-page scale would be numbered 00, 01, 02–99.

After determining the page of the scale on which the result of the calculation is to be read, the transparent sheet is moved so as to cause the marker 22 to overlie any origin on the proper scale sheet, whereupon that index of the transparent sheet which now overlies the scale of the scale sheet will overlie and indicate the position on the scale sheet that represents the result of the calculation.

When applied to multisheet scales this mode of operation is substantially less complex than that of previous devices of the same general character, and in order to make it practicable it is desirable to provide indicia on the transparent sheet for indicating the proper orientation of the sheets in multiplication and division operations respectively. For this purpose the present embodiment includes an indicium such as X at 27 in the upper left-hand corner of the sheet 16 indicating that that corner of the sheet should be uppermost in multiplication, and an indicium such as ÷ at 28 in the lower righthand corner of the sheet 16 indicating that the transparent sheet should be inverted with respect to the scale sheet to bring that corner uppermost in division operations. It is also desirable to provide an additional indicium such as ANS. at 30, to indicate that the indicated corner of sheet 16 should be uppermost in reading the answer.

It will be readily apparent that there may be embodied in the multisheet form the same means of finding logarithmic functions that have already been described in connection with the single-sheet form of scale.

It is obvious that either the single-page or the multiple-page form of our device can be used to perform addition and subtraction also if a scale of equal parts is substituted for the logarithmic scale extending, for example, from 11 to 15 on scale sheet 10. The procedure for addition and for subtraction is the same as that described above for multiplication and for division, respectively, except that when one of the two lowermost origins of such a scale or page of a scale is intercepted by or included within the perimeter of the large rectangle on the transparent sheet immediately after the marker has been brought into coincidence with an addend value on the scale sheet, a number equal to the total value represented by the scale sheet on which the added value occurs must be added to the result obtained by the calculation. Similarly, when a subtrahend value on the scale sheet is thus intercepted or included, a number equal to the total value represented by the scale sheet must be subtracted from the result obtained.

Figure 6:
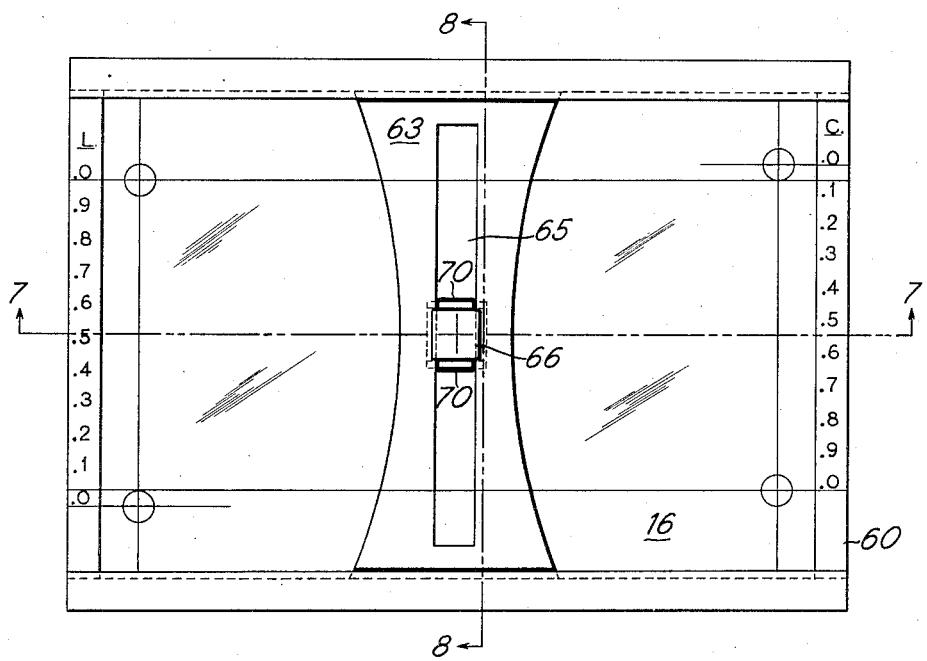
Figure 6 is a plan view of a device embodying our invention equipped with our improved indicating slider and lens mounting.
Figure 7:
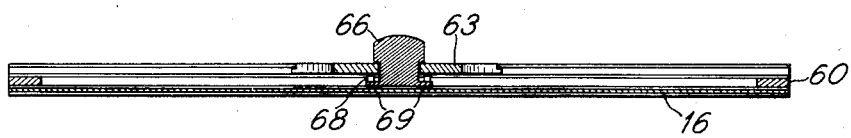
Figure 7 is a transverse sectional view of the device of Figure 6 taken on the line 7—7 of said figure.
Figure 8:
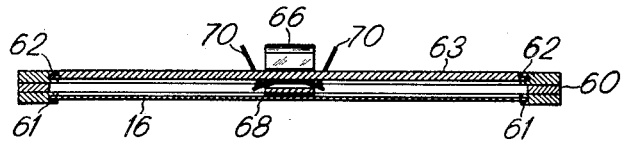
Figure 8 is a vertical sectional view of the device of Figure 6, taken on the line 8—8 of said figure.

While we have described a simple adhesive marker such as that shown at 22 in Figure 1 as capable of use in performing calculations with our device, we prefer to use a slider type of marker such as is illustrated in Figures 6, 7 and 8.

The preferred form of marker is mounted in a frame 60 provided with grooves 61 adapted to receive the transparent sheet 16, which frame can, of course, overlie the scale sheet 10 or any of the sheets 50, 51, etc., of a multisheet scale. Additional grooves 62 are provided in frame 60 to slidably receive a marker carrier 63 provided with a slot 65 in which a marker number 66, preferably in the form of a magnifying lens, is mounted for sliding movement at a right angle to the direction of movement of carrier 63. The marker 66 is grooved to engage the sides of slot 65, but the grooves are somewhat wider than the thickness of the material of carrier 63, and between the lower edge of the marker's groove and the under side of carrier 63 a spring 68 is compressed.

Spring 68 normally assumes the bowed form shown in Figure 8 so that it presses against the under side of carrier 63 and the lower edge of the groove of marker 66 tending to press the latter against the surface of sheet 16, and frictional pads 69 are secured to the under side of marker 66 to prevent inadvertent displacement thereof when it is so pressed down by the spring and to prevent abrasion of sheet 16 or of marker 66.

Ears 70 are provided on each end of spring 68, whereby the spring may be manually straightened to relieve the pressure of marker 66 against sheet 16 and permit adjustment thereof to any desired position in calculating.

While we have described certain specific embodiments of our invention, it will be understood that many modifications thereof will occur to those skilled in the art to which it appertains. Our invention, therefore, is not to be considered as limited to the forms shown except as required by the prior art and by the spirit of the appended claims.

We claim:

1. A calculating device comprising a series of sheets each provided with an equal portion of a single scale each portion being further subdivided into a plurality of equal parts disposed on equally spaced parallel scale lines, with indicia showing the conjunction points of said scale portions, and with two supplementary indicia in vertical alignment with said first mentioned indicia, the left-hand one thereof being spaced one scale line space width below the lowermost scale line, and the right-hand one being one scale line space width above the uppermost scale line; and a transparent sheet adapted to be superposed selectively upon any of said first mentioned sheets and provided with a plurality of index points disposed to register with the said indicia thereof.

2. A calculating device comprising a series of sheets each provided with an equal portion of a single scale each portion being further subdivided into a plurality of equal parts disposed on equally spaced parallel scale lines, with indicia showing the conjunction points of said scale portions, and with two supplementary indicia in vertical alignment with said first mentioned indicia, the left-hand one thereof being spaced one scale line space width below the lowermost scale line, and the right-hand one being one scale line space width above the uppermost scale line; a transparent sheet adapted to be superposed selectively upon any of said first mentioned sheets and provided with a plurality of index points disposed to register with the said indicia thereof and additional indicia on said transparent sheet for indicating reverse orientation of the same side of the latter with respect to the scale for multiplication and division calculations respectively.

3. A calculating device comprising a sheet provided with a scale, each portion being further subdivided into a plurality of equal parts disposed on equally spaced parallel scale lines, a transparent sheet adapted to be superposed thereon, said transparent sheet being provided with one or more index points related to said scale and with indicia indicating reverse orientation of the same side of the transparent sheet with respect to the scale for multiplication and division calculations respectively.

FREDERICK W. JOHNSON.
FRANK M. GOYAN.